(12) United States Patent
Zhou et al.

(10) Patent No.: US 9,940,294 B2
(45) Date of Patent: Apr. 10, 2018

(54) METHOD, APPARATUS, AND SYSTEM FOR CONFIGURING HIGH-SPEED SERIAL BUS PARAMETER

(71) Applicant: Huawei Technologies Co., Ltd., Shenzhen (CN)

(72) Inventors: Hongjun Zhou, Nanjing (CN); Shuicai Rao, Nanjing (CN); Jianzhao Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 14/820,071

(22) Filed: Aug. 6, 2015

(65) Prior Publication Data
US 2016/0048475 A1 Feb. 18, 2016

(30) Foreign Application Priority Data
Aug. 18, 2014 (CN) .......................... 2014 1 0409645

(51) Int. Cl.
| | |
|---|---|
| G06F 13/40 | (2006.01) |
| G06F 13/42 | (2006.01) |
| H04B 3/14 | (2006.01) |
| H04L 1/00 | (2006.01) |
| H04L 25/03 | (2006.01) |
| H04L 12/40 | (2006.01) |

(52) U.S. Cl.
CPC ...... *G06F 13/4282* (2013.01); *G06F 13/4086* (2013.01); *H04B 3/143* (2013.01); *H04L 1/0001* (2013.01); *H04L 12/40169* (2013.01); *H04L 25/03019* (2013.01); *H04L 25/03885* (2013.01)

(58) Field of Classification Search
None
See application file for complete search history.

(56) References Cited

U.S. PATENT DOCUMENTS

| | | | |
|---|---|---|---|
| 8,145,452 B1 * | 3/2012 | Masiewicz | ............ G06F 1/3221 702/189 |
| 2007/0300119 A1 | 12/2007 | Hidaka | |
| 2011/0241807 A1 * | 10/2011 | Matsui | .............. H04L 25/03057 333/28 R |
| 2014/0064351 A1 * | 3/2014 | Hidaka | ................... H04L 27/01 375/232 |

FOREIGN PATENT DOCUMENTS

JP    2004172660 A    6/2004

OTHER PUBLICATIONS

Foreign Communication From a Counterpart Application, European Application No. 15179698.4, Extended European Search Report dated Jan. 28, 2016, 9 pages.

\* cited by examiner

*Primary Examiner* — Ilwoo Park
(74) *Attorney, Agent, or Firm* — Conley Rose, P.C.

(57) ABSTRACT

A method for configuring a high-speed serial bus parameter, including sending an application signal from a transmit end of a high-speed serial bus to a receive end of the high-speed serial bus, searching a parameter configuration table for a high-speed serial bus parameter that matches all of a frequency of the application signal, a loss of the application signal on the high-speed serial bus, and a material type of a wiring board of the high-speed serial bus, and configuring the high-speed serial bus according to the high-speed serial bus parameter. According to the method, a problem involving configuration of a high-speed serial bus parameter when a transmitted signal is compensated may be solved.

11 Claims, 7 Drawing Sheets

METHOD, APPARATUS, AND SYSTEM FOR CONFIGURING HIGH-SPEED SERIAL BUS PARAMETER

CROSS-REFERENCE TO RELATED APPLICATION

This application claims priority to Chinese Patent Application No. 201410409645.0, filed on Aug. 18, 2014, which is hereby incorporated by reference in its entirety.

TECHNICAL FIELD

Embodiments of the present disclosure relate to the field of communications technologies, and in particular, to a method, an apparatus, and a system for configuring a high-speed serial bus parameter.

BACKGROUND

With the development of communications technologies, users and operators impose an increasingly high requirement on data transmission and require increasingly large transmission bandwidth. Because transmission bandwidth increases, a transmission device (for example, a switch) needs to bear an increasingly large transmission capacity and wiring on a circuit wiring board of the transmission device becomes increasingly complex. A high-speed serial bus is generally used for the wiring on the circuit wiring board of the transmission device, because the high-speed serial bus has advantages such as a strong anti-interference capability and a long transmission distance. However, during data transmission based on a high-speed serial bus, a transmitted signal is greatly attenuated in such transmission environments as a long distance, a high temperature, and a low temperature; therefore, the transmitted signal needs to be compensated. A general practice is: using a pre-emphasis technology to compensate the transmitted signal at a transmit end of the high-speed serial bus by using a transmit-end chip that is connected to the transmit end of the high-speed serial bus; and using an equalization technology to compensate the transmitted signal at a receive end of the high-speed serial bus by using a receive-end chip that is connected to the receive end of the high-speed serial bus. This involves configuration of parameters at two ends of a high-speed serial bus when a transmitted signal is compensated.

FIG. 1 is a schematic diagram of a method for configuring a high-speed serial bus parameter in the prior art. As shown in FIG. 1, a real data transmission stream is simulated by using a pseudo random binary sequence (PRBS) code stream, and specific steps are as follows: S101: In a normal temperature environment, based on a PRBS code stream, select a optimal parameter. S102: Verify whether the selected optimal parameter is available in such a high temperature environment and a low temperature environment. If yes, execute S103, and if not, execute S104. S103: Configure the high-speed serial bus parameter by using the optimal parameter selected in the normal temperature environment. S104: Replace a material of a circuit wiring board of a transmission device with a material with a less loss, and/or shorten a length of a high-speed serial bus. After S104 is executed, it needs to go back to S101 to select an optimal parameter again, until the optimal parameter selected in the normal temperature environment is also available in such the environment as the high temperature and the low temperature.

However, as a transmission capacity borne by a transmission device increases, a greater quantity of parameters need to be configured, and optimal parameters selected in a normal temperature environment may be unavailable in a high/low temperature environment. Therefore, the foregoing method for configuring a high-speed serial bus parameter in the prior art requires a huge workload, thereby resulting in low efficiency.

SUMMARY

Embodiments of the present disclosure provide a method, an apparatus, and a system for configuring a high-speed serial bus parameter, which are used to improve efficiency of configuring a high-speed serial bus parameter.

To achieve the foregoing objective, the embodiments of the present disclosure use the following technical solutions In a first aspect, an embodiment of the present disclosure provides a method for configuring a high-speed serial bus parameter, including sending an application signal from a transmit end of a high-speed serial bus to a receive end of the high-speed serial bus, where the application signal is used to carry information about transmission data, acquiring a loss of the application signal on the high-speed serial bus and a material type of a wiring board of the high-speed serial bus, and acquiring a frequency of the application signal according to a transmit rate or a receive rate of the application signal, searching a parameter configuration table for a high-speed serial bus parameter that matches all of: the frequency of the application signal, the loss of the application signal on the high-speed serial bus, and the material type of the wiring board of the high-speed serial bus, where the parameter configuration table includes a correspondence between a bus parameter and a signal frequency, a signal loss, and a material type of a wiring board, and configuring the high-speed serial bus according to the high-speed serial bus parameter.

With reference to the first aspect, in a first possible implementation manner of the first aspect, the acquiring a loss of the application signal on the high-speed serial bus includes acquiring a first amplitude of the application signal at the transmit end of the high-speed serial bus and a second amplitude of the application signal at the receive end of the high-speed serial bus, and calculating the loss of the application signal on the high-speed serial bus according to the first amplitude and the second amplitude.

With reference to the first aspect, in a second possible implementation manner of the first aspect, the acquiring a material type of a wiring board of the high-speed serial bus includes sending a first code stream, a second code stream, and a third code stream from the transmit end of the high-speed serial bus to the receive end of the high-speed serial bus, acquiring an amplitude $A_1$ of the first code stream at the transmit end of the high-speed serial bus and an amplitude $A_1'$ of the first code stream at the receive end of the high-speed serial bus, acquiring an amplitude $A_2$ of the second code stream at the transmit end of the high-speed serial bus and an amplitude $A_2'$ of the second code stream at the receive end of the high-speed serial bus, and acquiring an amplitude $A_3$ of the third code stream at the transmit end of the high-speed serial bus and an amplitude $A_3'$ of the third code stream at the receive end of the high-speed serial bus, acquiring a frequency $N_1$ of the first code stream, a frequency $N_2$ of the second code stream, and a frequency $N_3$ of the third code stream, calculating a loss $S_1$ of the first code stream on the high-speed serial bus according to the amplitude $A_1$ and the amplitude $A_1'$, calculating a loss $S_2$ of the second code stream on the high-speed serial bus according to the amplitude $A_2$ and the amplitude $A_2'$, and calculating a loss $S_3$ of the third code stream on the high-speed serial bus according to the amplitude $A_3$ and the amplitude $A_3'$, and determining the material type of the wiring board of the high-speed serial bus according to the frequency $N_1$ of the first code stream and the loss $S_1$ of the first code stream on the high-speed serial bus, the frequency $N_2$ of the second code stream and the loss $S_2$ of the second code stream on the high-speed serial bus, the frequency $N_3$ of the third code stream and the loss $S_3$ of the third code stream on the high-speed serial bus, and a material type characteristics table of the wiring board of the high-speed serial bus, where the material type characteristics table includes a correspondence among a material type of a wiring board, a loss of a transmitted signal, and a frequency of the transmitted signal.

With reference to the first aspect, the first possible implementation manner of the first aspect, or the second possible implementation manner of the first aspect, in a third possible implementation manner, the method further includes: acquiring the parameter configuration table, and the acquiring the parameter table includes simulating a data transmission stream by using a PRBS, testing, based on the selected frequency, material type of the wiring board of the high-speed serial bus, and loss of the signal on the high-speed serial bus, the high-speed serial bus parameter, and selecting a parameter with a largest bit-error-free interval as an optimal parameter, verifying whether a margin of the selected optimal parameter is greater than a preset threshold, and if yes, using the optimal parameter as a high-speed serial bus parameters that matches the selected frequency, material type of the wiring board of the high-speed serial bus, and loss of the signal on the high-speed serial bus, and writing the high-speed serial bus parameter into the parameter configuration table.

In a second aspect, an embodiment of the present disclosure provides an apparatus for configuring a high-speed serial bus parameter, including a sending module configured to send an application signal from a transmit end of a high-speed serial bus to a receive end of the high-speed serial bus, where the application signal is used to carry information about transmission data, an acquiring module configured to acquire a loss of the application signal on the high-speed serial bus and a material type of a wiring board of the high-speed serial bus, and further configured to acquire a frequency of the application signal according to a transmit rate or a receive rate of the application signal, a searching module configured to search a parameter configuration table for a high-speed serial bus parameter that matches all of: the frequency of the application signal, the loss of the application signal on the high-speed serial bus, and the material type of the wiring board of the high-speed serial bus, where the parameter configuration table includes a correspondence between a bus parameter and a signal frequency, a signal loss, and a material type of a wiring board, and a configuring module configured to configure the high-speed serial bus according to the high-speed serial bus parameter.

With reference to the second aspect, in a first possible implementation manner of the second aspect, the acquiring module includes a first acquiring unit, where the first acquiring unit is configured to acquire a first amplitude of the application signal at the transmit end of the high-speed serial bus and a second amplitude of the application signal at the receive end of the high-speed serial bus; and calculate the loss of the application signal on the high-speed serial bus according to the first amplitude and the second amplitude.

With reference to the second aspect, in a second possible implementation manner of the second aspect, the sending module is further configured to send a first code stream, a second code stream, and a third code stream from the transmit end of the high-speed serial bus to the receive end of the high-speed serial bus, and the acquiring module includes a second acquiring unit, where the second acquiring unit is configured to acquire an amplitude $A_1$ of the first code stream at the transmit end of the high-speed serial bus and an amplitude $A_1'$ of the first code stream at the receive end of the high-speed serial bus, acquire an amplitude $A_2$ of the second code stream at the transmit end of the high-speed serial bus and an amplitude $A_2'$ of the second code stream at the receive end of the high-speed serial bus, and acquire an amplitude $A_3$ of the third code stream at the transmit end of the high-speed serial bus and an amplitude $A_3'$ of the third code stream at the receive end of the high-speed serial bus; acquire a frequency $N_1$ of the first code stream, a frequency $N_2$ of the second code stream, and a frequency $N_3$ of the third code stream; calculate a loss $S_1$ of the first code stream on the high-speed serial bus according to the amplitude $A_1$ and the amplitude $A_1'$, calculate a loss $S_2$ of the second code stream on the high-speed serial bus according to the amplitude $A_2$ and the amplitude $A_2'$, and calculate a loss $S_3$ of the third code stream on the high-speed serial bus according to the amplitude $A_3$ and the amplitude $A_3'$; and determine the material type of the wiring board of the high-speed serial bus according to the frequency $N_1$ of the first code stream and the loss $S_1$ of the first code stream on the high-speed serial bus, the frequency $N_2$ of the second code stream and the loss $S_2$ of the second code stream on the high-speed serial bus, the frequency $N_3$ of the third code stream and the loss $S_3$ of the third code stream on the high-speed serial bus, and a material type characteristics table of the wiring board of the high-speed serial bus, where the material type characteristics table includes a correspondence among a material type of a wiring board, a loss of a transmitted signal, and a frequency of the transmitted signal.

With reference to the second aspect, the first possible implementation manner of the second aspect, or the second possible implementation manner of the second aspect, in a third possible implementation manner, the apparatus further includes a generating module configured to generate the parameter configuration table.

With reference to the second aspect or the third possible implementation manner of the second aspect, in a fourth possible implementation manner, the generating module is configured to simulate a data transmission stream by using a pseudo random binary sequence PRBS, test, based on the selected frequency, material type of the wiring board of the high-speed serial bus, and loss of the signal on the high-speed serial bus, the high-speed serial bus parameter, and select a parameter with a largest bit-error-free interval as an optimal parameter, and if it is determined that a margin of the optimal parameter is greater than a preset threshold, use the optimal parameter as a high-speed serial bus parameter that matches the selected frequency, material type of the wiring board of the high-speed serial bus, and loss of the signal on the high-speed serial bus, and write the high-speed serial bus parameter into the parameter configuration table.

In a third aspect, an embodiment of the present disclosure provides a system for configuring a high-speed serial bus parameter, including a high-speed serial bus, a transmit end and a receive end of the high-speed serial bus, and the apparatus for configuring a high-speed serial bus parameter according to the second aspect and any one of the possible implementation manners of the second aspect.

According to the technical solutions provided in the embodiments of the present disclosure, an application signal is sent from a transmit end of a high-speed serial bus to a receive end of the high-speed serial bus; a frequency of the application signal, a loss of the application signal on the high-speed serial bus, and a material type of a wiring board of the high-speed serial bus are acquired; then, a parameter configuration table that is defined in advance is searched for a high-speed serial bus parameter that matches the frequency of the application signal, the loss of the application signal on the high-speed serial bus, and the material type of the wiring board of the high-speed serial bus; and then, quick configuration of the high-speed serial bus may be implemented according to the found high-speed serial bus parameter. According to the technical solutions provided in the embodiments of the present disclosure, because a parameter configuration table including high-speed serial bus parameters that match with different signal frequencies, different signal losses, and different material types of a wiring board of a high-speed serial bus is defined in advance, efficiency of configuring a high-speed serial bus parameter can be improved.

BRIEF DESCRIPTION OF DRAWINGS

To describe the technical solutions in the embodiments of the present disclosure more clearly, the following briefly introduces the accompanying drawings required for describing the embodiments or the prior art. the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
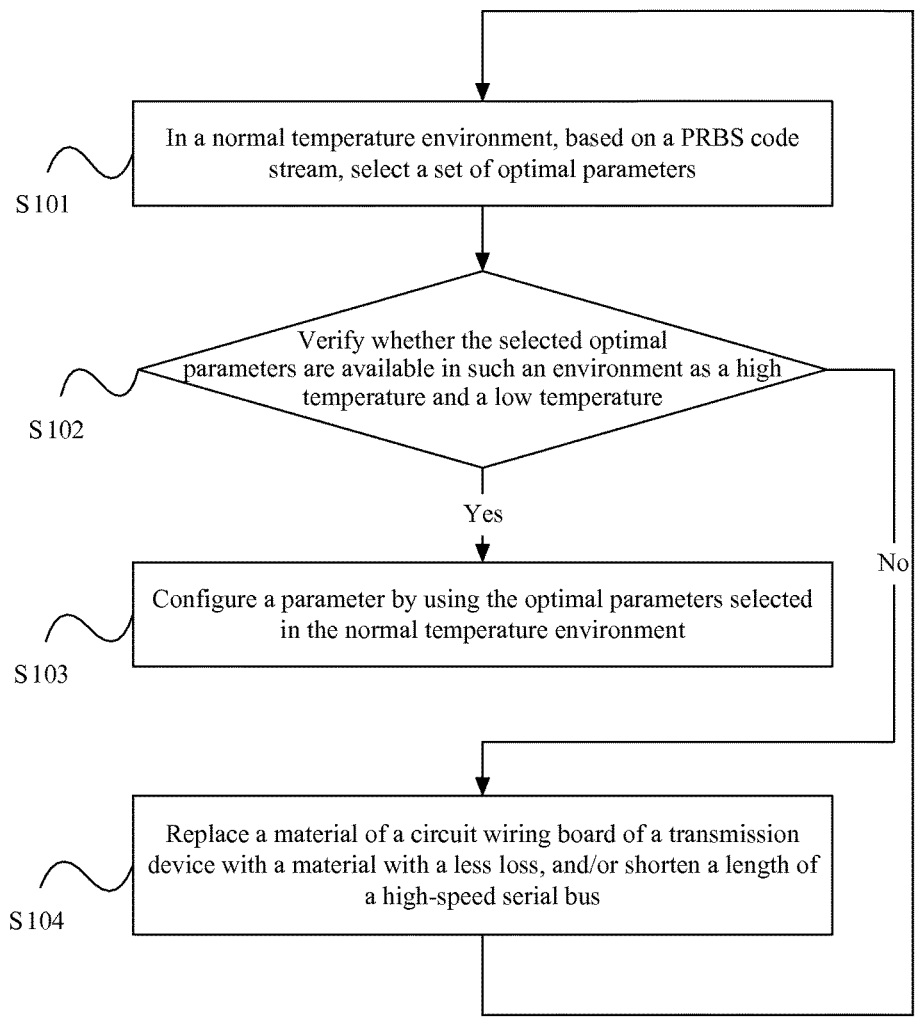
FIG. 1 is a schematic diagram of a method for configuring a high-speed serial bus parameter.
Figure 2:
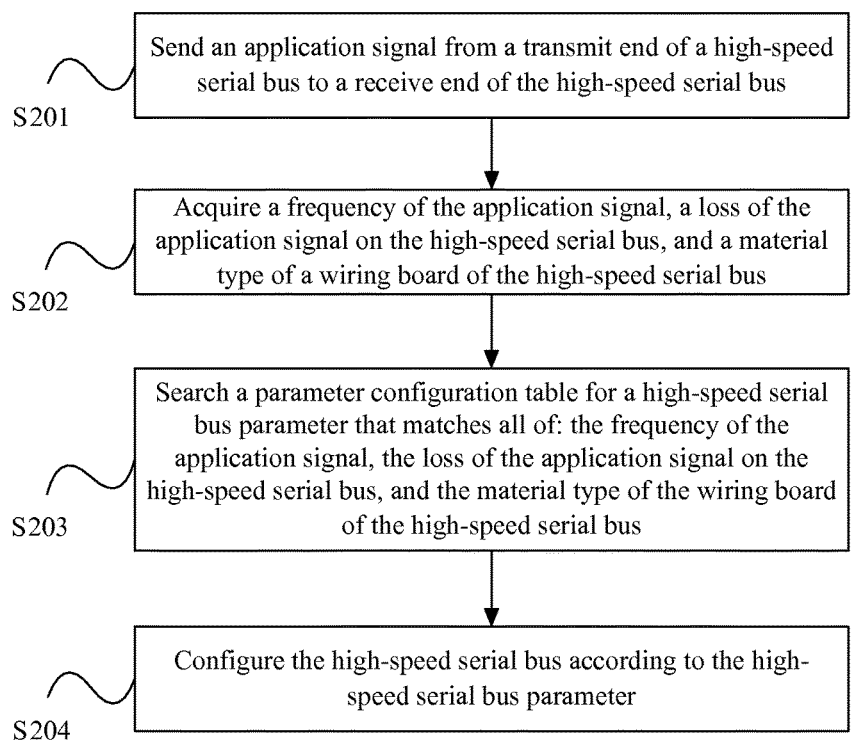
FIG. 2 is a flowchart of a method for configuring a high-speed serial bus parameter according to an embodiment of the present disclosure.

FIG. 2 is a flowchart of a method for configuring a high-speed serial bus parameter according to an embodiment of the present disclosure. As shown in FIG. 2, the method in this embodiment may include the following content.

S201: Send an application signal from a transmit end of a high-speed serial bus to a receive end of the high-speed serial bus.

In a process of transmitting the application signal by using the high-speed serial bus, attenuation of the application signal occurs on the high-speed serial bus, and the application signal is compensated by using a pre-emphasis technology at the transmit end of the high-speed serial bus and using an equalization technology at the receive end of the high-speed serial bus. Therefore, parameters need to be configured at the two ends of the high-speed serial bus, so as to satisfy a need for compensating the application signal.

S202: Acquire a frequency of the application signal, a loss of the application signal on the high-speed serial bus, and a material type of a wiring board of the high-speed serial bus.

the loss of the application signal on the high-speed serial bus is related to the frequency of the application signal and the material type of the wiring board of the high-speed serial bus; and an apparatus for configuring a high-speed serial bus parameter may obtain the frequency of the application signal according to a rate of the application signal at the transmit end or the receive end of the high-speed serial bus, and may obtain the loss of the application signal on the high-speed serial bus according to an amplitude of the application signal at the transmit end and the receive end of the high-speed serial bus. For the material type of the wiring board of the high-speed serial bus, because a material type characteristics table, which is provided by a manufacturer of the wiring board of the high-speed serial bus, of the wiring board of the high-speed serial bus includes a relationship between a loss of a transmitted signal on a high-speed serial bus with each type of material and a frequency of the transmitted signal, losses of testing signals with different frequencies on a high-speed serial bus may be tested, and then the material type of the wiring board of the high-speed serial bus is determined according to the material type characteristics table, which is provided by the manufacturer of the wiring board of the high-speed serial bus, of the wiring board of the high-speed serial bus.

S203: Search a parameter configuration table for a high-speed serial bus parameter that matches all of: the frequency of the application signal, the loss of the application signal on the high-speed serial bus, and the material type of the wiring board of the high-speed serial bus.

S204: Configure the high-speed serial bus according to the high-speed serial bus parameter.

the parameter configuration table may be defined in advance. The parameter configuration table includes a correspondence between a bus parameter and a signal frequency, a signal loss, and a material type of a wiring board, that is, includes high-speed serial bus parameters that match different signal frequencies, different signal losses, and different material types of a wiring board of a high-speed serial bus. Therefore, after the frequency of the application signal, the loss of the application signal on the high-speed serial bus, and the material type of the wiring board of the high-speed serial bus are acquired, the high-speed serial bus parameter that matches the frequency of the application signal, the loss of the application signal on the high-speed serial bus, and the material type of the wiring board of the high-speed serial bus may be found, and then, the high-speed serial bus may be configured according to the found high-speed serial bus parameter.

In this embodiment, an application signal is sent from a transmit end of a high-speed serial bus to a receive end of the high-speed serial bus; a frequency of the application signal, a loss of the application signal on the high-speed serial bus, and a material type of a wiring board of the high-speed serial bus are acquired; then, a parameter configuration table that is defined in advance is searched for a high-speed serial bus parameter that matches the frequency of the application signal, the loss of the application signal on the high-speed serial bus, and the material type of the wiring board of the high-speed serial bus; and then, quick configuration of the high-speed serial bus may be implemented according to the found high-speed serial bus parameter. Because a parameter configuration table including high-speed serial bus parameters that match different signal frequencies, different signal losses, and different material types of a wiring board of a high-speed serial bus is defined in advance, the technical solution provided in this embodiment of the present disclosure can improve efficiency of configuring a high-speed serial bus parameter.

According to the foregoing method, the step of acquiring the frequency of the application signal includes: acquiring, from the transmit end of the high-speed serial bus, a transmit rate of the application signal, or acquiring, from the receive end of the high-speed serial bus, a receive rate of the application signal; and calculating the frequency of the application signal according to the transmit rate or the receive rate of the application signal. The step of acquiring the loss of the application signal on the high-speed serial bus includes: acquiring an amplitude of the application signal at the transmit end of the high-speed serial bus and an amplitude of the application signal at the receive end of the high-speed serial bus; and calculating the loss of the application signal on the high-speed serial bus according to the amplitude of the application signal at the transmit end of the high-speed serial bus and the amplitude of the application signal at the receive end of the high-speed serial bus.

For example, an application signal 010101 . . . 0101 is sent from the transmit end of the high-speed serial bus at a signal rate of N gigabit/second (Gbit/s), and an amplitude of the application signal at the transmit end of the high-speed serial bus is read. When the application signal is received at the receive end of the high-speed serial bus, an amplitude of the application signal at the receive end of the high-speed serial bus is read from clock and data recovery (CDR). As may be known from that a transmit rate of the application signal is N Gbit/s, a frequency of the application signal is N/2 gigabit, and then, a loss of the application signal at the frequency of N/2 gigabit may be calculated according to the amplitude of the application signal at the receive end of the high-speed serial bus and the amplitude of the application signal at the transmit end of the high-speed serial bus.

Figure 3:
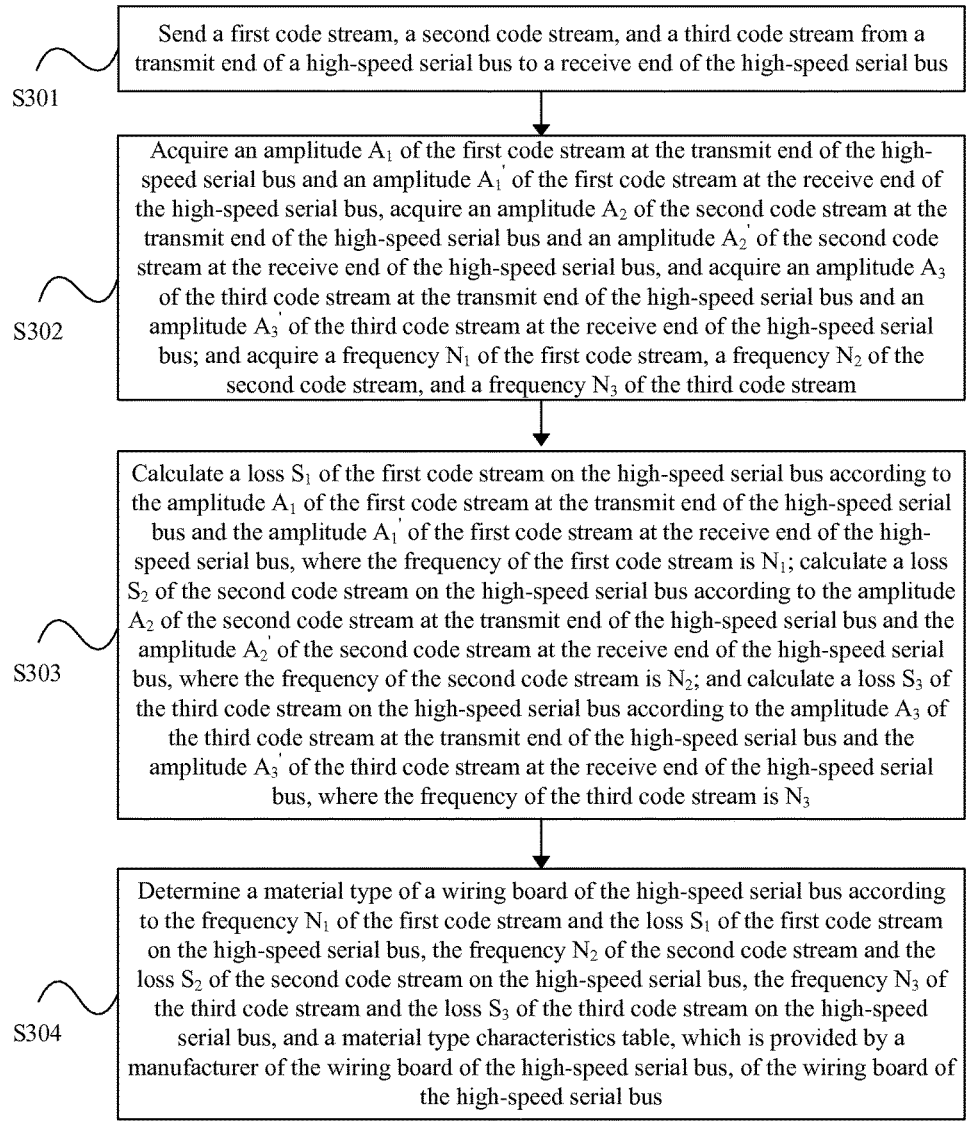
FIG. 3 is a flowchart of determining a material type of a wiring board of a high-speed serial bus according to an embodiment of the present disclosure.

FIG. 3 is a flowchart of determining a material type of a wiring board of a high-speed serial bus according to an embodiment of the present disclosure. As shown in FIG. 3, the method in this embodiment may include the following content.

S301: Send a first code stream, a second code stream, and a third code stream from a transmit end of a high-speed serial bus to a receive end of the high-speed serial bus.

S302: Acquire an amplitude $A_1$ of the first code stream at the transmit end of the high-speed serial bus and an amplitude $A_1'$ of the first code stream at the receive end of the high-speed serial bus, acquire an amplitude $A_2$ of the second code stream at the transmit end of the high-speed serial bus and an amplitude $A_2'$ of the second code stream at the receive end of the high-speed serial bus, and acquire an amplitude $A_3$ of the third code stream at the transmit end of the high-speed serial bus and an amplitude $A_3'$ of the third code stream at the receive end of the high-speed serial bus; and acquire a frequency $N_1$ of the first code stream, a frequency $N_2$ of the second code stream, and a frequency $N_3$ of the third code stream.

S303: Calculate a loss $S_1$ of the first code stream on the high-speed serial bus according to the amplitude $A_1$ of the first code stream at the transmit end of the high-speed serial bus and the amplitude $A_1'$ of the first code stream at the receive end of the high-speed serial bus, where the frequency of the first code stream is $N_1$; calculate a loss $S_2$ of the second code stream on the high-speed serial bus according to the amplitude $A_2$ of the second code stream at the transmit end of the high-speed serial bus and the amplitude $A_2'$ of the second code stream at the receive end of the high-speed serial bus, where the frequency of the second code stream is $N_2$; and calculate a loss $S_3$ of the third code stream on the high-speed serial bus according to the amplitude $A_3$ of the third code stream at the transmit end of the high-speed serial bus and the amplitude $A_3'$ of the third code stream at the receive end of the high-speed serial bus, where the frequency of the third code stream is $N_3$.

S304: Determine a material type of a wiring board of the high-speed serial bus according to the frequency $N_1$ of the first code stream and the loss $S_1$ of the first code stream on the high-speed serial bus, the frequency $N_2$ of the second code stream and the loss $S_2$ of the second code stream on the high-speed serial bus, the frequency N3 of the third code stream and the loss S3 of the third code stream on the high-speed serial bus, and a material type characteristics table, which is provided by a manufacturer of the wiring board of the high-speed serial bus, of the wiring board of the high-speed serial bus.

The material type characteristics table includes a correspondence between a loss of a transmitted signal on a high-speed serial bus with each type of material and a frequency of the transmitted signal.

The first code stream, the second code stream, and the third code stream may be pseudo random binary sequences PRBSs. For example, a first code stream 010101 . . . 0101 is sent from the transmit end of the high-speed serial bus at a signal rate of N Gbit/s, and an amplitude of the first code stream at the transmit end of the high-speed serial bus is read. When the first code stream is received at the receive end of the high-speed serial bus, an amplitude of the first code stream at the receive end of the high-speed serial bus is read from CDR. As can be known from that a transmit rate of the first code stream is N Gbit/s, a frequency of the first code stream is N/2 gigabit, and then, a loss $S_1$ of the first code stream at the frequency of N/2 gigabit may be calculated according to the amplitude of the first code stream at the receive end of the high-speed serial bus and the amplitude of the first code stream at the transmit end of the high-speed serial bus.

Similarly, a loss $S_2$ of a second code stream 00110011 . . . 00110011 at a frequency of N/4 gigabit and a loss $S_3$ of a third code stream 0000111100001111 . . . 00001111 at a frequency of N/8 gigabit may be calculated; and the material type of the wiring board may be determined according to a proportional relationship among $S_1$, $S_2$, and $S_3$ and a loss relationship between different types of materials of the wiring board at each frequency, where the loss relationship is included in the material type characteristics table, which is provided by the manufacturer, of the wiring board.

The foregoing method further includes: acquiring a parameter configuration table. Preferably, the acquiring a parameter configuration table includes simulating a data transmission stream by using a pseudo random binary sequence PRBS, testing, based on the selected frequency, material type of the wiring board of the high-speed serial bus, and loss of the signal on the high-speed serial bus, a high-speed serial bus parameter, and selecting a parameter with a largest bit-error-free interval as an optimal parameter, verifying, by using a parameter adjustment tool provided by a manufacturer of a receive-end chip of the high-speed serial bus, whether a margin of the selected optimal parameter is greater than a preset threshold, and if yes, using the optimal parameter as a high-speed serial bus parameter that matches the selected frequency, material type of the wiring board of the high-speed serial bus, and loss of the signal on the high-speed serial bus, and writing the high-speed serial bus parameter into the parameter configuration table.

Figure 4:
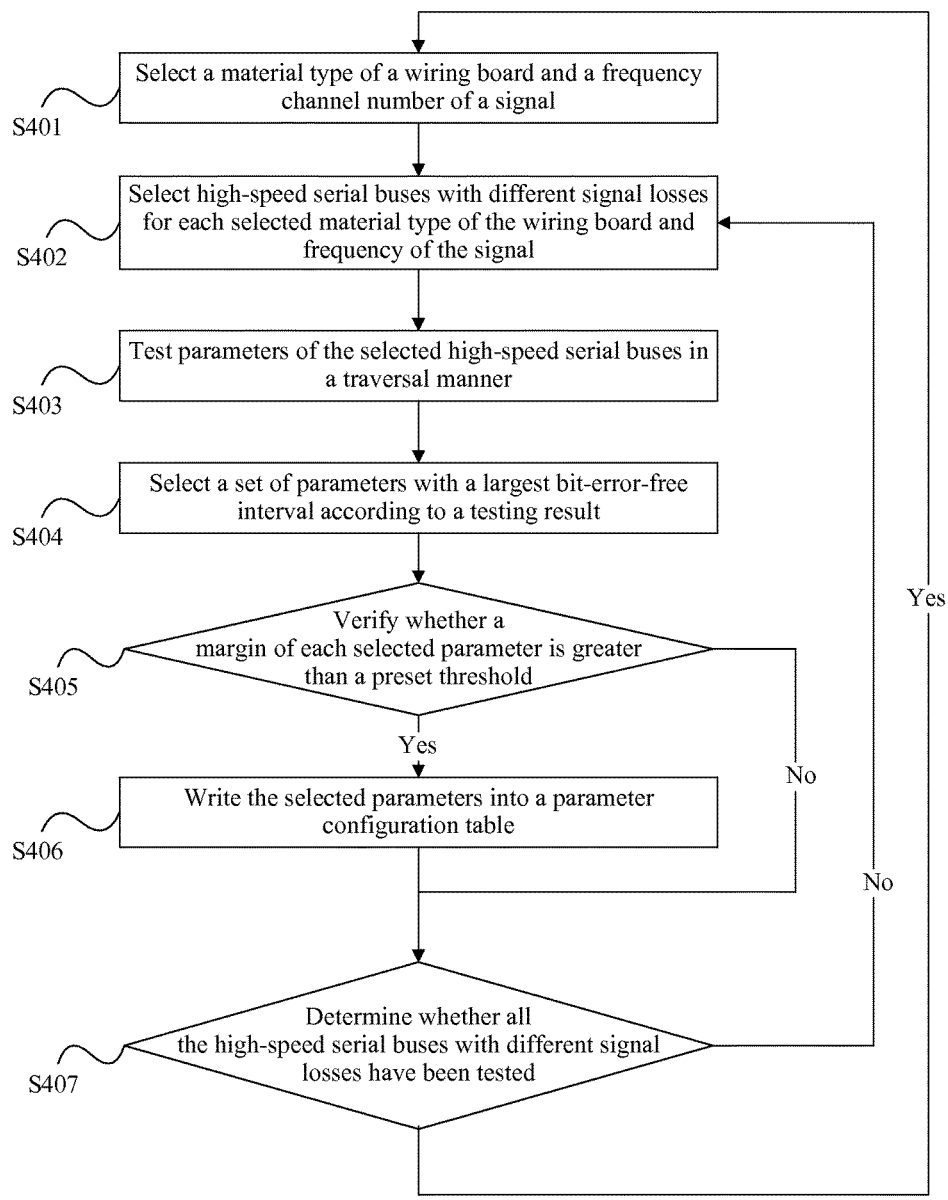
FIG. 4 is a flowchart of defining a parameter configuration table according to an embodiment of the present disclosure.

FIG. 4 is a flowchart of defining a parameter configuration table according to an embodiment of the present disclosure. As shown in FIG. 4, steps of defining the parameter configuration table in this embodiment includes S401: Select a material type of a wiring board and a frequency of a signal.

S402: Select high-speed serial buses with different signal losses for each selected material type of the wiring board and frequency of the signal.

S403: Test parameters of the selected high-speed serial buses in a traversal manner.

S404: Select a set of parameters with a largest bit-error-free interval according to a testing result.

S405: Verify whether a margin of the selected parameter is greater than a preset threshold, and if yes, execute S406, and otherwise, execute S407.

S406: Write the selected parameter into a parameter configuration table.

After the selected parameter is written into the parameter configuration table, go to S407.

S407: Determine whether all the high-speed serial buses with different signal losses have been tested, if not, go back to S402 to continue to test the other high-speed serial buses with signal losses in a traversal manner; and if yes, go back to S401 to select a material type of a wiring board and a frequency of a signal again, until all parameters of high-speed serial buses with different material types of wiring boards, different signal frequencies, and different signal losses are tested, so as to eventually complete definition of the parameter configuration table.

Table 1 is a parameter configuration table of a signal at a frequency N1, Table 2 is a parameter configuration table of a signal at a frequency N2, and Table 3 is a parameter configuration table of a signal at a frequency Nm. A loss of the signal at the frequency Nm may be obtained by means of calculation according to a differential loss value of a material of a wiring board at the frequency Nm and a length of a high-speed serial bus, where the differential loss value refers to a relationship between a signal loss and a length of a high-speed serial bus.

It should be noted that Table 1, Table 2, and Table 3 are schematic tables for ease of understanding for readers, and a format of the parameter configuration table is not limited herein.

TABLE 1

Parameter configuration table of a signal at a frequency N1

| Frequency N1 | Loss 1 (dB) | Loss 2 (dB) | ... | Loss n (dB) |
|---|---|---|---|---|
| Material A | Parameter set $N_1(A_1)$ | Parameter set $N_1(A_2)$ | ... | Parameter set $N_1(A_3)$ |
| Material B | Parameter set $N_1(B_1)$ | Parameter set $N_1(B_2)$ | ... | Parameter set $N_1(B_3)$ |
| Material C | Parameter set $N_1(C_1)$ | Parameter set $N_1(C_2)$ | ... | Parameter set $N_1(C_3)$ |

TABLE 2

Parameter configuration table of a signal at a frequency N2

| Frequency N2 | Loss 1 (dB) | Loss 2 (dB) | ... | Loss n (dB) |
|---|---|---|---|---|
| Material A | Parameter set $N_2(A_1)$ | Parameter set $N_2(A_2)$ | ... | Parameter set $N_2(A_3)$ |
| Material B | Parameter set $N_2(B_1)$ | Parameter set $N_2(B_2)$ | ... | Parameter set $N_2(B_3)$ |
| Material C | Parameter set $N_2(C_1)$ | Parameter set $N_2(C_2)$ | ... | Parameter set $N_2(C_3)$ |

TABLE 3

Parameter configuration table of a signal at a frequency Nm

| Frequency Nm | Loss 1 (dB) | Loss 2 (dB) | ... | Loss n (dB) |
|---|---|---|---|---|
| Material A | Parameter set $N_m(A_1)$ | Parameter set $N_m(A_2)$ | ... | Parameter set $N_m(A_3)$ |
| Material B | Parameter set $N_m(B_1)$ | Parameter set $N_m(B_2)$ | ... | Parameter set $N_m(B_3)$ |
| Material C | Parameter set $N_m(C_1)$ | Parameter set $N_m(C_2)$ | ... | Parameter set $N_m(C_3)$ |

In this embodiment, a parameter configuration table of a high-speed serial bus is defined in advance, so that in an actual application process, the parameter configuration table that is defined in advance only needs to be searched for a high-speed serial bus parameter that matches a frequency of an application signal, a loss of the application signal on the high-speed serial bus, and a material type of a wiring board of the high-speed serial bus, so as to configure the high-speed serial bus according to the found high-speed serial bus parameter, thereby improving efficiency of configuring a high-speed serial bus parameter.

Figure 5:
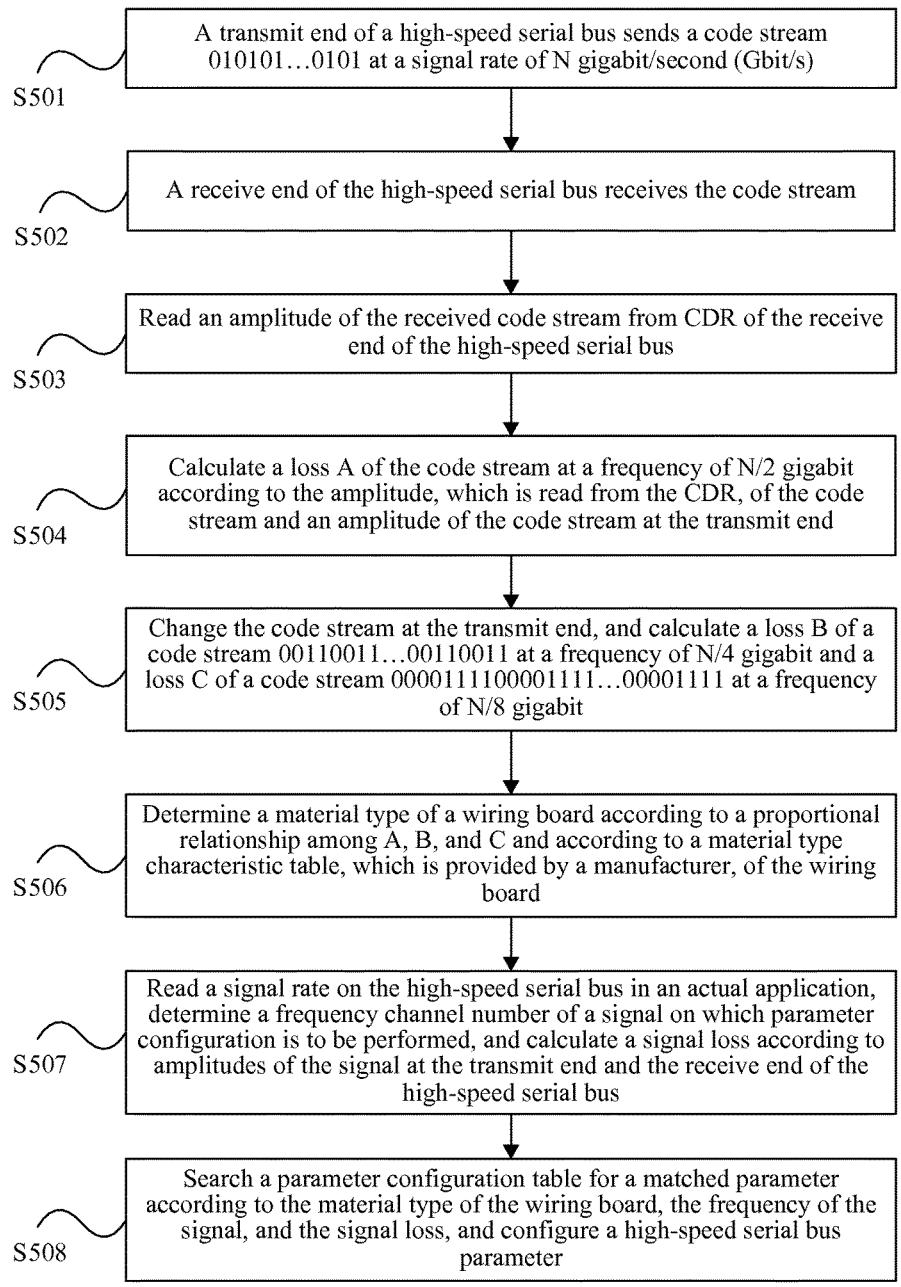
FIG. 5 is a flowchart of another method for configuring a high-speed serial bus parameter according to an embodiment of the present disclosure.

FIG. 5 is a flowchart of another method for configuring a high-speed serial bus parameter according to an embodiment of the present disclosure. As shown in FIG. 5, the method in this embodiment may include the following content.

S501: A transmit end of a high-speed serial bus sends a code stream 010101 . . . 0101 at a signal rate of N Gbit/s.

S502: A receive end of the high-speed serial bus receives the code stream.

S503: Read an amplitude of the received code stream from CDR of the receive end of the high-speed serial bus.

S504: Calculate a loss A of the code stream at a frequency of N/2 gigabit according to the amplitude, which is read from the CDR, of the code stream and an amplitude of the code stream at the transmit end.

S505: Change the code stream at the transmit end, and calculate a loss B of a code stream 00110011 . . . 00110011 at a frequency of N/4 gigabit and a loss C of a code stream 0000111100001111 . . . 00001111 at a frequency of N/8 gigabit.

S506: Determine a material type of a wiring board according to a proportional relationship among A, B, and C and according to a material type characteristic table, which is provided by a manufacturer, of the wiring board.

S507: Read a signal rate on the high-speed serial bus in an actual application, determine a frequency of a signal on which parameter configuration is to be performed, and calculate a signal loss according to amplitudes of the signal at the transmit end and the receive end of the high-speed serial bus.

S508: Search a parameter configuration table for a matched parameter according to the material type of the wiring board, the frequency of the signal, and the signal loss, and configure a high-speed serial bus parameter.

In this embodiment, first, PRBSs with different frequencies are used as testing signals to determine a material type of a wiring board of a high-speed serial bus; then, a signal loss of an actual application signal on the high-speed serial bus is calculated; and then, a parameter configuration table that is defined in advance is searched for a high-speed serial bus parameter that matches a frequency of the application signal, a loss of the application signal on the high-speed serial bus, and the material type of the wiring board of the high-speed serial bus, thereby implementing quick configuration of the high-speed serial bus.

Figure 6:
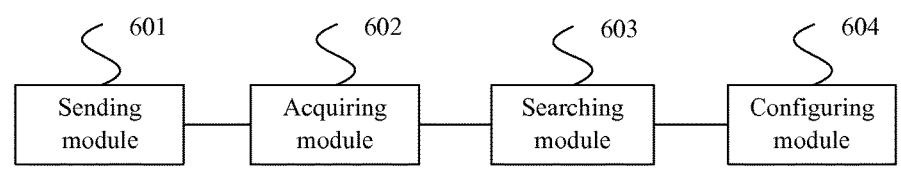
FIG. 6 is a schematic structural diagram of an apparatus for configuring a high-speed serial bus parameter according to an embodiment of the present disclosure.

FIG. 6 is a schematic structural diagram of an apparatus for configuring a high-speed serial bus parameter according to an embodiment of the present disclosure. As shown in FIG. 6, the apparatus for configuring a high-speed serial bus parameter in this embodiment may include: a sending module 601, an acquiring module 602, a searching module 603, and a configuring module 604. The sending module 601 is configured to send an application signal from a transmit end of a high-speed serial bus to a receive end of the high-speed serial bus, where the application signal is used to carry information about transmission data; the acquiring module 602 is configured to acquire a loss of the application signal on the high-speed serial bus and a material type of a wiring board of the high-speed serial bus, and is further configured to acquire a frequency of the application signal according to a transmit rate or a receive rate of the application signal; the searching module 603 is configured to search a parameter configuration table for a high-speed serial bus parameter that matches all of: the frequency of the application signal, the loss of the application signal on the high-speed serial bus, and the material type of the wiring board of the high-speed serial bus, where the parameter configuration table includes a correspondence between a bus parameter and a signal frequency, a signal loss, and a material type of a wiring board; and the configuring module 604 is configured to configure the high-speed serial bus according to the high-speed serial bus parameter.

The apparatus for configuring a high-speed serial bus parameter in this embodiment may be configured to execute the method in the method embodiment shown in FIG. 2, and has corresponding functional modules; implementation principles and technical effects to be achieved are similar, and details are not described herein again.

Figure 7:
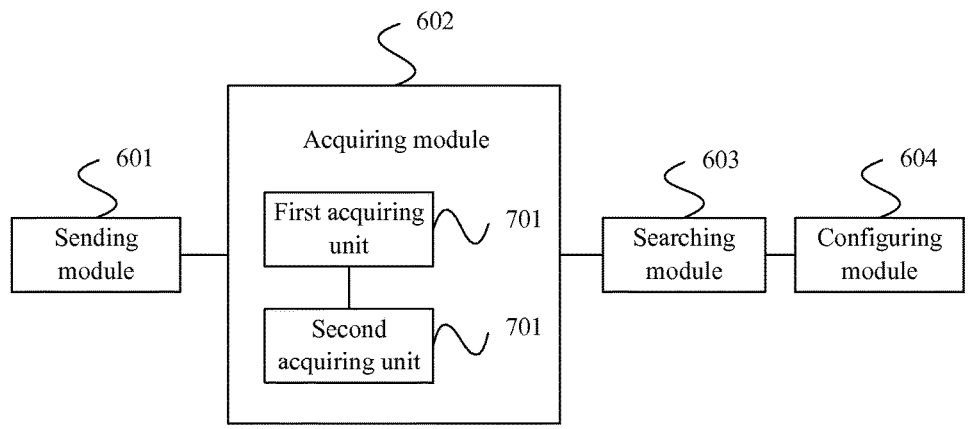
FIG. 7 is a schematic structural diagram of another apparatus for configuring a high-speed serial bus parameter according to an embodiment of the present disclosure.

On the basis of the apparatus described in FIG. 6, FIG. 7 is a schematic structural diagram of another apparatus for configuring a high-speed serial bus parameter according to an embodiment of the present disclosure. As shown in FIG. 7, the acquiring module 602 includes a first acquiring unit 701. The first acquiring unit 701 is configured to acquire a first amplitude of the application signal at the transmit end of the high-speed serial bus and a second amplitude of the application signal at the receive end of the high-speed serial bus; and calculate the loss of the application signal on the high-speed serial bus according to the first amplitude and the second amplitude.

Implementation principles and technical effects to be achieved of the apparatus for configuring a high-speed serial bus parameter in this embodiment have been described in the foregoing, and details are not described herein again.

As shown in FIG. 7, the acquiring module 602 further includes a second acquiring unit 702. The sending module 601 is further configured to send, from the transmit end of the high-speed serial bus, a first code stream, a second code stream, and a third code stream to the receive end of the high-speed serial bus; the second acquiring unit 702 is configured to acquire an amplitude $A_1$ of the first code stream at the transmit end of the high-speed serial bus and an amplitude $A_1'$ of the first code stream at the receive end of the high-speed serial bus, acquire an amplitude $A_2$ of the second code stream at the transmit end of the high-speed serial bus and an amplitude $A_2'$ of the second code stream at the receive end of the high-speed serial bus; and acquire an amplitude $A_3$ of the third code stream at the transmit end of the high-speed serial bus and an amplitude $A_3'$ of the third code stream at the receive end of the high-speed serial bus; acquire a frequency $N_1$ of the first code stream, a frequency $N_2$ of the second code stream, and a frequency $N_3$ of the third code stream; calculate a loss $S_1$ of the first code stream on the high-speed serial bus according to the amplitude $A_1$ and the amplitude $A_1'$, calculate a loss $S_2$ of the second code stream on the high-speed serial bus according to the amplitude $A_2$ and the amplitude $A_2'$, and calculate a loss $S_3$ of the third code stream on the high-speed serial bus according to the amplitude $A_3$ and the amplitude $A_3'$; and determine the material type of the wiring board of the high-speed serial bus according to the frequency $N_1$ of the first code stream and the loss $S_1$ of the first code stream on the high-speed serial bus, the frequency $N_2$ of the second code stream and the loss $S_2$ of the second code stream on the high-speed serial bus, the frequency $N_3$ of the third code stream and the loss $S_3$ of the third code stream on the high-speed serial bus, and a material type characteristics table of the wiring board of the high-speed serial bus, where the material type characteristics table includes a correspondence among a material type of a wiring board, a loss of a transmitted signal, and a frequency of the transmitted signal.

The apparatus for configuring a high-speed serial bus parameter in this embodiment may be configured to execute the method in the method embodiment shown in FIG. 3, and has corresponding functional modules; implementation principles and technical effects to be achieved are similar, and details are not described herein again.

Figure 8:
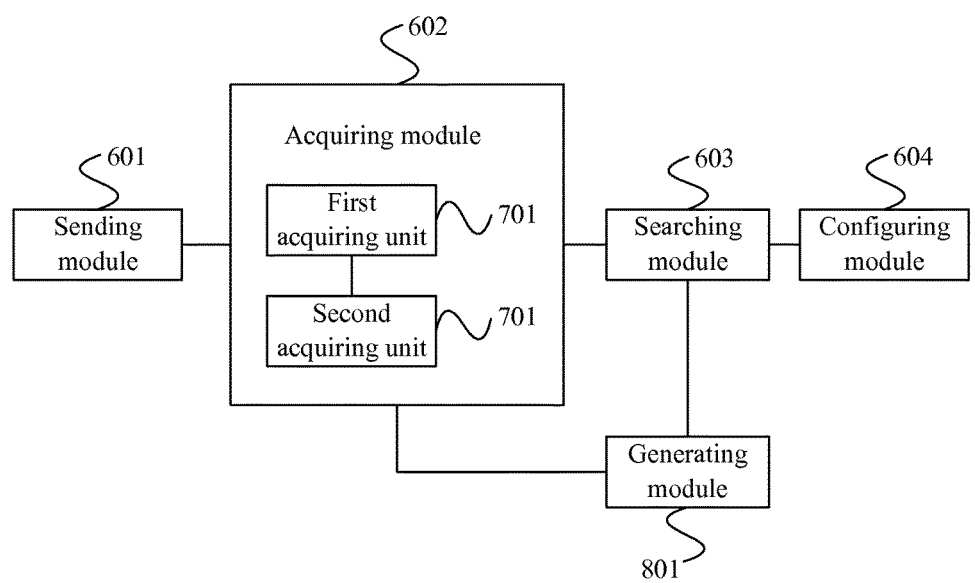
FIG. 8 is a schematic structural diagram of still another apparatus for configuring a high-speed serial bus parameter according to an embodiment of the present disclosure.

Based on the apparatus described in FIG. 6 or FIG. 7, FIG. 8 is a schematic structural diagram of still another apparatus for configuring a high-speed serial bus parameter according to an embodiment of the present disclosure. As shown in FIG. 8, the apparatus for configuring a high-speed serial bus parameter in this embodiment may further includes a generating module 801. The generating module 801 is configured to generate the parameter configuration table. The generating module 801 is configured to simulate a data transmission stream by using a pseudo random binary sequence PRBS, test, based on the selected frequency, material type of the wiring board of the high-speed serial bus, and loss of the signal on the high-speed serial bus, the high-speed serial bus parameter, and select a parameter with a largest bit-error-free interval as an optimal parameter, and if it is determined that a margin of the optimal parameter is greater than a preset threshold, use the optimal parameter as a high-speed serial bus parameter that matches the selected frequency, material type of the wiring board of the high-speed serial bus, and loss of the signal on the high-speed serial bus, and write the high-speed serial bus parameter into the parameter configuration table.

Implementation principles and technical effects to be achieved of the apparatus for configuring a high-speed serial bus parameter in this embodiment have been described in the foregoing, and details are not described herein again.

Figure 9:
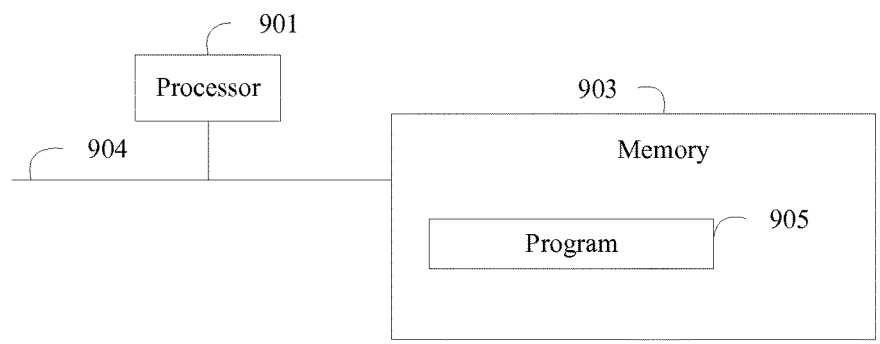
FIG. 9 is a schematic diagram of a hardware structure of an apparatus for configuring a high-speed serial bus parameter according to an embodiment of the present disclosure.

FIG. 9 is a schematic diagram of a hardware structure of an apparatus for configuring a high-speed serial bus parameter according to an embodiment of the present disclosure. As shown in FIG. 9, the apparatus for configuring a high-speed serial bus parameter includes at least one processor 901, for example, a central processing unit (CPU), a memory 903, and at least one communications bus 904 for implementing connections and communication between apparatuses. The processor 901 is configured to execute an executable module, for example, a computer program, stored in the memory 903. The memory 903 may include a high-speed random access memory (RAM), and may also include a non-volatile memory, for example, at least one magnetic disk memory.

In some implementation manners, the memory 903 stores a program 905, and the processor 901 executes the program 905 stored in the memory 903, so as to implement a method for configuring a high-speed serial bus parameter, where the method includes sending an application signal from a transmit end of a high-speed serial bus to a receive end of the high-speed serial bus, where the application signal is used to carry information about transmission data, acquiring a loss of the application signal on the high-speed serial bus and a material type of a wiring board of the high-speed serial bus, and acquiring a frequency of the application signal according to a transmit rate or a receive rate of the application signal, searching a parameter configuration table for a high-speed serial bus parameter that matches all of: the frequency of the application signal, the loss of the application signal on the high-speed serial bus, and the material type of the wiring board of the high-speed serial bus, where the parameter configuration table includes a correspondence between a bus parameter and a signal frequency, a signal loss, and a material type of a wiring board, and configuring the high-speed serial bus according to the high-speed serial bus parameter.

According to the foregoing program for executing the method for configuring a high-speed serial bus parameter, preferably, the acquiring a loss of the application signal on the high-speed serial bus includes acquiring a first amplitude of the application signal at the transmit end of the high-speed serial bus and a second amplitude of the application signal at the receive end of the high-speed serial bus, and calculating the loss of the application signal on the high-speed serial bus according to the first amplitude and the second amplitude.

According to the foregoing program for executing the method for configuring a high-speed serial bus parameter, preferably, the acquiring a material type of a wiring board of the high-speed serial bus includes sending a first code stream, a second code stream, and a third code stream from the transmit end of the high-speed serial bus to the receive end of the high-speed serial bus, acquiring an amplitude $A_1$ of the first code stream at the transmit end of the high-speed serial bus and an amplitude $A_1'$ of the first code stream at the receive end of the high-speed serial bus, acquiring an amplitude $A_2$ of the second code stream at the transmit end of the high-speed serial bus and an amplitude $A_2'$ of the second code stream at the receive end of the high-speed serial bus, and acquiring an amplitude $A_3$ of the third code stream at the transmit end of the high-speed serial bus and an amplitude $A_3'$ of the third code stream at the receive end of the high-speed serial bus, acquiring a frequency $N_1$ of the first code stream, a frequency $N_2$ of the second code stream, and a frequency $N_3$ of the third code stream, calculating a loss $S_1$ of the first code stream on the high-speed serial bus according to the amplitude $A_1$ and the amplitude $A_1'$, calculating a loss $S_2$ of the second code stream on the high-speed serial bus according to the amplitude $A_2$ and the amplitude $A_2'$, and calculating a loss $S_3$ of the third code stream on the high-speed serial bus according to the amplitude $A_3$ and the amplitude $A_3'$, and determining the material type of the wiring board of the high-speed serial bus according to the frequency $N_1$ of the first code stream and the loss $S_1$ of the first code stream on the high-speed serial bus, the frequency $N_2$ of the second code stream and the loss $S_2$ of the second code stream on the high-speed serial bus, the frequency $N_3$ of the third code stream and the loss $S_3$ of the third code stream on the high-speed serial bus, and a material type characteristics table of the wiring board of the high-speed serial bus, where the material type characteristics table includes a correspondence among a material type of a wiring board, a loss of a transmitted signal, and a frequency of the transmitted signal.

According to the foregoing program for executing the method for configuring a high-speed serial bus parameter, preferably, the method further includes: acquiring the parameter configuration table.

The acquiring the parameter table includes simulating a data transmission stream by using a PRBS, testing, based on the selected frequency, material type of the wiring board of the high-speed serial bus, and loss of the signal on the high-speed serial bus, the high-speed serial bus parameter, and selecting a parameter with a largest bit-error-free interval as an optimal parameter, verifying whether a margin of the selected optimal parameter is greater than a preset threshold, and if yes, using the optimal parameter as a high-speed serial bus parameter that matches the selected frequency, material type of the wiring board of the high-speed serial bus, and loss of the signal on the high-speed serial bus, and writing the high-speed serial bus parameter into the parameter configuration table.

The apparatus for configuring a high-speed serial bus parameter provided in the embodiment of the present disclosure, a high-speed serial bus, and a transmit end and a receive end of the high-speed serial bus together form a system for configuring a high-speed serial bus parameter. The apparatus for configuring a high-speed serial bus parameter is shown in any one of FIG. 6 to FIG. 9, specific implementation principles and details are as described above, and details are not described herein again.

During specific implementation, the system for configuring a high-speed serial bus parameter may be any device implemented by using a high-speed serial bus, for example, a switch or a router.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for configuring a high-speed serial bus parameter, comprising:
sending an application signal from a transmit end of a high-speed serial bus to a receive end of the high-speed serial bus, wherein the application signal is used to carry information about transmission data;
acquiring a loss of the application signal on the high-speed serial bus and a material type of a wiring board of the high-speed serial bus;
acquiring a frequency of the application signal according to one of a transmit rate and a receive rate of the application signal;
searching a parameter configuration table for the high-speed serial bus parameter that matches all of: the frequency of the application signal, the loss of the application signal on the high-speed serial bus, and the material type of the wiring board of the high-speed serial bus, wherein the parameter configuration table comprises a correspondence between a bus parameter and a signal frequency, a signal loss, and a material type of a wiring board;
configuring the high-speed serial bus according to the high-speed serial bus parameter,
wherein acquiring the material type of the wiring board of the high-speed serial bus comprises:
sending a first code stream, a second code stream, and a third code stream from the transmit end of the high-speed serial bus to the receive end of the high-speed serial bus;
acquiring an amplitude $A_1$ of the first code stream at the transmit end of the high-speed serial bus and an amplitude $A_1'$ of the first code stream at the receive end of the high-speed serial bus;
acquiring an amplitude $A_2$ of the second code stream at the transmit end of the high-speed serial bus and an amplitude $A_2'$ of the second code stream at the receive end of the high-speed serial bus;
acquiring an amplitude $A_3$ of the third code stream at the transmit end of the high-speed serial bus and an amplitude $A_3'$ of the third code stream at the receive end of the high-speed serial bus;
acquiring a frequency $N_1$ of the first code stream, a frequency $N_2$ of the second code stream, and a frequency $N_3$ of the third code stream;
calculating a loss $S_1$ of the first code stream on the high-speed serial bus according to the amplitude $A_1$ and the amplitude $A_1'$;
calculating a loss $S_2$ of the second code stream on the high-speed serial bus according to the amplitude $A_2$ and the amplitude $A_2'$;
calculating a loss $S_3$ of the third code stream on the high-speed serial bus according to the amplitude $A_3$ and the amplitude $A_3'$; and
determining the material type of the wiring board of the high-seed serial bus according to: the frequency $N_1$ of the first code stream and the loss $S_1$ of the first code stream on the high-speed serial bus, the frequency $N_2$ of the second code stream and the loss $S_2$ of the second code stream on the high-speed serial bus, the frequency $N_3$ of the third code stream and the loss $S_3$ of the third code stream on the high-speed serial bus, and a material type characteristics table of the wiring board of the high-speed serial bus, and wherein the material type characteristics table comprises: a correspondence among the material type of the wiring board, a loss of a transmitted signal, and a frequency of the transmitted signal.

2. The method according to claim 1, wherein acquiring the loss of the application signal on the high-speed serial bus comprises:
acquiring a first amplitude of the application signal at the transmit end of the high-speed serial bus and a second amplitude of the application signal at the receive end of the high-speed serial bus; and
calculating the loss of the application signal on the high-speed serial bus according to the first amplitude and the second amplitude.

3. The method according to claim 1, wherein the method further comprises acquiring the parameter configuration table, and wherein acquiring the parameter configuration table comprises:
simulating a data transmission stream by using a pseudo random binary sequence (PRBS);
testing, based on a selected frequency, a selected material type of the wiring board of the high-speed serial bus, and a selected loss of the data transmission stream on the high-speed serial bus, parameters of the high-speed serial bus;
selecting a parameter with a largest bit-error-free interval from the parameters of the high-speed serial bus as an optimal parameter;
verifying whether a margin of the optimal parameter is greater than a preset threshold;
using the optimal parameter as a verified high-speed serial bus parameter that matches the selected frequency, the selected material type of the wiring board of the high-speed serial bus, and the selected loss of the data transmission stream on the high-speed serial bus when the margin of the optimal parameter is greater than the preset threshold; and
writing the verified high-speed serial bus parameter into the parameter configuration table.

4. An apparatus for configuring a high-speed serial bus parameter, comprising:
a transmitter configured to send an application signal from a transmit end of a high-speed serial bus to a receive end of the high-speed serial bus, wherein the application signal is used to carry information about transmission data;
a processor coupled to the transmitter and configured to:
acquire a loss of the application signal on the high-speed serial bus and a material type of a wiring board of the high-speed serial bus;
acquire a frequency of the application signal according to one of a transmit rate and a receive rate of the application signal;
search a parameter configuration table for the high-speed serial bus parameter that matches all of: the frequency of the application signal, the loss of the application signal on the high-speed serial bus, and the material type of the wiring board of the high-speed serial bus, wherein the parameter configuration table comprises a correspondence between a bus parameter and a signal frequency, a signal loss, and the material type of the wiring board; and
configure the high-speed serial bus according to the high-speed serial bus parameter,
wherein the transmitter is further configured to send a first code stream, a second code stream, and a third code stream from the transmit end of the high-speed serial bus to the receive end of the high-speed serial bus,
wherein the processor is further configured to:
acquire an amplitude $A_1$ of the first code stream at the transmit end of the high-speed serial bus and an amplitude $A_1'$ of the first code stream at the receive end of the high-speed serial bus;
acquire an amplitude $A_2$ of the second code stream at the transmit end of the high-speed serial bus and an amplitude $A_2'$ of the second code stream at the receive end of the high-speed serial bus;
acquire an amplitude $A_3$ of the third code stream at the transmit end of the high-speed serial bus and an amplitude $A_3'$ of the third code stream at the receive end of the high-seed serial bus:
acquire a frequency $N_1$ of the first code stream, a frequency $N_2$ of the second code stream, and a frequency $N_3$ of the third code stream;
calculate a loss $S_1$ of the first code stream on the high-speed serial bus according to the amplitude $A_1$ and the amplitude $A_1'$;
calculate a loss $S_2$ of the second code stream on the high-speed serial bus according to the amplitude $A_2$ and the amplitude $A_2'$;
calculate a loss $S_3$ of the third code stream on the high-speed serial bus according to the amplitude $A_3$ and the amplitude $A_3'$; and
determine the material type of the wiring board of the high-speed serial bus according to: the frequency $N_1$ of the first code stream, the loss $S_1$ of the first code stream on the high-speed serial bus, the frequency $N_2$ of the second code stream and the loss $S_2$ of the second code stream on the high-speed serial bus, the frequency $N_3$ of the third code stream and the loss $S_3$ of the third code stream on the high-speed serial bus, and a material type characteristics table of the wiring board of the high-speed serial bus, and
wherein the material type characteristics table comprises: a correspondence among the material type of the wiring board, a loss of a transmitted signal, and a frequency of the transmitted signal.

5. The apparatus according to claim 4, wherein the processor is her configured to:
acquire a first amplitude of the application signal at the transmit end of the high-speed serial bus and a second amplitude of the application signal at the receive end of the high-speed serial bus; and
calculate the loss of the application signal on the high-speed serial bus according to the first amplitude and the second amplitude.

6. The apparatus according to claim 4, wherein the processor is further configured to generate the parameter configuration table.

7. The apparatus according to claim 6, wherein the processor is further configured to:
simulate a data transmission stream by using a pseudo random binary sequence (PRBS);
test, based on a selected frequency, a selected material type of the wiring board of the high-speed serial bus, and a selected loss of the data transmission stream on the high-speed serial bus, parameters of the high-speed serial bus;
select a parameter with a largest bit-error-free interval as an optimal parameter from the parameters of the high-speed serial bus;
verify whether a margin of the optimal parameter is greater than a preset threshold; and use the optimal parameter as a verified high-speed serial bus parameter that matches the selected frequency, the selected material type of the wiring board of the high-speed serial bus, and the selected loss of the data transmission stream on the high-speed serial bus when it is determined that a margin of the optimal parameter is greater than a preset threshold; and
write the verified high-speed serial bus parameter into the parameter configuration table.

8. A system for configuring a high-speed serial bus parameter, comprising:
a high-speed serial bus comprising a transmit end a receive end; and
a processor coupled to the high-speed serial bus and configured to:
send an application signal from a transmit end of a high-speed serial bus to a receive end of the high-speed serial bus, wherein the application signal is used to carry information about transmission data;
acquire a loss of the application signal on the high-speed serial bus and a material type of a wiring board of the high-speed serial bus;
acquire a frequency of the application signal according to one of a transmit rate and a receive rate of the application signal;
search a parameter configuration table for a high-speed serial bus parameter that matches all of: the frequency of the application signal, the loss of the application signal on the high-speed serial bus, and the material type of the wiring board of the high-speed serial bus, wherein the parameter configuration table comprises: a correspondence between a bus parameter and a signal frequency, a signal loss, and a material type of the wiring board;
configure the high-speed serial bus according to the high-speed serial bus parameter;
cause a first code stream, a second code stream, and a third code stream to be sent from the transmit end of the high-speed serial bus to the receive end of the high-speed serial bus;
acquire an amplitude $A_1$ of the first code stream at the transmit end of the high-speed serial bus and an amplitude $A_1'$ of the first code stream at the receive end of the high-speed serial bus:
acquire an amplitude $A_2$ of the second code stream at the transmit end of the high-speed serial bus and an amplitude $A_2'$ of the second code stream at the receive end of the high-speed serial bus;
acquire an amplitude $A_3$ of the third code stream at the transmit end of the high-speed serial bus and an amplitude $A_3'$ of the third code stream at the receive end of the high-speed serial bus;
acquire a frequency $N_1$ of the first code stream, a frequency $N_2$ of the second code stream, and a frequency $N_3$ of the third code stream:
calculate a loss $S_1$ of the first code stream on the high-speed serial bus according to the amplitude $A_1$ and the amplitude $A_1'$;
calculate a loss $S_2$ of the second code stream on the high-speed serial bus according to the amplitude $A_2$ and the amplitude $A_2'$;
calculate a loss $S_3$ of the third code stream on the high-speed serial bus according to the amplitude $A_3$ and the amplitude $A_3'$; and
determine the material type of the wiring board of the high-speed serial bus according to: the frequency $N_1$ of the first code stream, the loss $S_1$ of the first code stream on the high-speed serial bus, the frequency $N_2$ of the second code stream and the loss $S_2$ of the second code stream on the high-speed serial bus, the frequency $N_3$ of the third code stream, the loss $S_3$ of the third code stream on the high-speed serial bus, and a material type characteristics table of the wiring board of the high-speed serial bus, wherein the material type characteristics table comprises: a correspondence among the material type of the wiring board, a loss of a transmitted signal, and a frequency of the transmitted signal.

9. The system according to claim 8, wherein the processor is further configured to:

acquire a first amplitude of the application signal at the transmit end of the high-speed serial bus and a second amplitude of the application signal at the receive end of the high-speed serial bus; and calculate the loss of the application signal on the high-speed serial bus according to the first amplitude and the second amplitude.

10. The system according to claim 8, wherein the processor is further configured to generate the parameter configuration table.

11. The system according to claim 10, wherein the processor is further configured to:

simulate a data transmission stream by using a pseudo random binary sequence (PRBS);

test, based on a selected frequency, a selected material type of the wiring board of the high-speed serial bus, and a selected loss of the data transmission stream on the high-speed serial bus, parameters of the high-speed serial bus; and select a parameter with a largest bit-error-free interval as an optimal parameter from the parameters of the high-speed serial bus;

verify whether a margin of the optimal parameter is greater than a preset threshold; and use the optimal parameter as a verified high-speed serial bus parameter that matches a selected frequency, the material type of the wiring board of the high-speed serial bus, and the loss of the data transmission stream on the high-speed serial bus when it is determined that a margin of the optimal parameter is greater than a preset threshold; and write the verified high-speed serial bus parameter into the parameter configuration table.

* * * * *